United States Patent
Miyabe et al.

(10) Patent No.: US 7,434,606 B2
(45) Date of Patent: Oct. 14, 2008

(54) PNEUMATIC TIRE WITH TREAD HAVING CONTINUOUS RIBS AND BLOCK ROWS

(75) Inventors: Saburo Miyabe, Grossauheim (DE); Tadao Matsumoto, Kobe (JP)

(73) Assignee: The Goodyear Tire & Rubber Company, Akron, OH (US)

( * ) Notice: Subject to any disclaimer, the term of this patent is extended or adjusted under 35 U.S.C. 154(b) by 468 days.

(21) Appl. No.: 10/541,773

(22) PCT Filed: Feb. 25, 2004

(86) PCT No.: PCT/JP2004/002226

§ 371 (c)(1), (2), (4) Date: Jul. 8, 2005

(87) PCT Pub. No.: WO2004/082965

PCT Pub. Date: Sep. 30, 2004

(65) Prior Publication Data
US 2006/0137791 A1  Jun. 29, 2006

(30) Foreign Application Priority Data
Feb. 28, 2003 (JP) ............................. 2003-053738

(51) Int. Cl.
*B60C 11/03* (2006.01)
*B60C 11/13* (2006.01)
(52) U.S. Cl. ............... 152/209.2; 152/209.15; 152/209.22; 152/209.28
(58) Field of Classification Search ............ 152/209.2, 152/209.3, 209.15, 209.18, 209.28, 209.22; D12/560, 561
See application file for complete search history.

(56) References Cited

U.S. PATENT DOCUMENTS
5,109,903 A * 5/1992 Watanabe et al. ...... 152/209.15

(Continued)

FOREIGN PATENT DOCUMENTS
EP          438319          * 7/1991

(Continued)

OTHER PUBLICATIONS
Machine translation for Japan 11-334317, Jun. 23, 2008.*

(Continued)

*Primary Examiner*—Steven D Maki
(74) *Attorney, Agent, or Firm*—Robert N. Lipcsik (57) ABSTRACT

A tread surface 2 is divided by inner and outer longitudinal grooves 3a and 3b located on opposite sides of the tire equator into a central land portion 4i, intermediate land portions 4m and shoulder land portions 4o. The intermediate land portion 4i includes an inclined grooves 9 having an angle θ with respect to the circumferential direction of the tire, and the angle is increased from an inner end (mi) away from the inner longitudinal grooves 3a by a small distance La to an outer end (mo) where the intermediate land portion intersects with the outer longitudinal grooves 3b. An angle θi in the inner end (mi) is 0 to 25°, and an angle θo in the outer end (mo) is 60 to 80°. A pitch P1 of the inclined grooves 9 in the circumferential direction is greater than a pitch P2 of lug grooves 5 provided in the shoulder land portion 4o in the circumferential direction.

14 Claims, 3 Drawing Sheets

U.S. PATENT DOCUMENTS

| | | | | |
|---|---|---|---|---|
| 5,188,684 | A | * | 2/1993 | Himuro .................. 152/290.28 |
| 5,435,364 | A | * | 7/1995 | Hasegawa et al. ...... 152/209.28 |
| 5,996,661 | A | * | 12/1999 | Gerresheim et al. .... 152/209.28 |
| 6,109,317 | A | * | 8/2000 | Iwamura et al. ........ 152/209.28 |
| 6,371,180 | B1 | * | 4/2002 | Hayashi ................. 152/209.28 |

FOREIGN PATENT DOCUMENTS

| | | | |
|---|---|---|---|
| EP | 0 565 270 | | 10/1993 |
| EP | 788898 | * | 8/1997 |
| JP | 04-002508 A | | 1/1992 |
| JP | 04-008606 A | | 1/1992 |
| JP | 06-199109 | * | 7/1994 |
| JP | 07-285303 A | | 10/1995 |
| JP | 07-290907 | * | 11/1995 |
| JP | 10-236112 A | | 9/1998 |
| JP | 10-258614 A | | 9/1998 |
| JP | 11-227420 A | | 8/1999 |
| JP | 11 334317 | | 12/1999 |
| JP | 2000-229506 A | | 8/2000 |
| JP | 2003 011616 | | 1/2003 |
| KR | 2002-0096167 | * | 12/2002 |

OTHER PUBLICATIONS

European Search Report, completed Dec. 13, 2007.
Patent Abstracts of Japan, Publication No. 11334317 dated Dec. 7, 1999.
Patent Abstracts of Japan, Publication No. 2003011616 dated Jan. 15, 2003.

* cited by examiner

PNEUMATIC TIRE WITH TREAD HAVING CONTINUOUS RIBS AND BLOCK ROWS

TECHNICAL FIELD

The present invention relates to a pneumatic tire which is suitable as a high performance tire having directional pattern, and in which anti-hydroplaning performance is enhanced while suppressing the deterioration of steering stability and noise performance.

BACKGROUND TECHNIQUE

In order to enhance the anti-hydroplaning performance of the tire, it is general means to increase a groove width and a groove depth of a tread groove formed in a tread surface, and to enhance the dewatering performance. According to such means, however, as the pattern rigidity is reduced and a groove volume is increased, the steering stability and the noise performance on a dry road are deteriorated.

Thereupon, in recent years, an attempt has been made to employ an inclined groove instead of a longitudinal groove which extends in a circumferential direction of the tire, and to enhance the anti-hydroplaning performance while suppressing the deterioration of the steering stability and the noise performance. With such an attempt, a tread end of the inclined groove is formed into a gently inclined groove portion having an angle close to an axial direction of the tire, thereby securing a pattern rigidity in a tread shoulder region, and a portion of the inclined groove closer to a tread equator is formed into an steep inclined groove portion having an angle closer to the circumferential direction of the tire, thereby enhancing the dewatering performance.

With such a technique, however, the anti-hydroplaning performance can not be enhanced sufficiently, and further improvement of the anti-hydroplaning performance especially at the time of turning is desired.

This is because that in the dewatering performance near the tire equator, a dewatering effect obtained by the longitudinal groove is more excellent than a dewatering effect obtained by the inclined groove. When a vehicle turns, a position where a ground pressure becomes highest is shifted toward a tread end in the grounding surface. At that time, in the case of a tire having the inclined groove, the position where the ground pressure becomes highest is shifted to a gently inclined groove portion of the inclined groove, and sufficient dewatering effect can not be exhibited when the vehicle turns.

The present invention has been accomplished in view of such circumstances, and based on an idea that the longitudinal grooves and the inclined grooves are used in a specific combination, it is an object of the invention to provide a pneumatic tire capable of largely enhancing the anti-hydroplaning performance while suppressing the deterioration of the steering stability and the noise performance.

DISCLOSURE OF THE INVENTION

The present invention provides a pneumatic tire in which a tread surface thereof is divided into a central land portion between inner longitudinal grooves, intermediate land portions between the inner and outer longitudinal grooves, and shoulder land portions axially outside the outer longitudinal grooves, by being provided with the inner longitudinal grooves extending on both sides of a tire equator in a circumferential direction of the tire and the outer longitudinal grooves extending on both sides thereof in the circumferential direction of the tire, wherein the central land portion and the intermediate land portions are formed into circumferential ribs which continuously extend in the circumferential direction of the tire, and on each of the shoulder land portions, blocks divided by lug grooves are arranged as a block row in the circumferential direction of the tire, the intermediate land portion includes an inclined groove extending outward in the axial direction of the tire from an inner end of the inner longitudinal grooves away from a small distance La to an outer end which intersects with the outer longitudinal grooves while increasing an angle θ with respect to the circumferential direction of the tire, the angle θ in the inner end is 0 to 25° and the angle θ in the outer end is 60 to 80°, a pitch between the inclined grooves in the circumferential direction of the tire is greater than a pitch between the lug grooves in the circumferential direction of the tire.

BEST MODE FOR CARRYING OUT THE INVENTION

An embodiment of the present invention will be explained together with illustrated examples.

Figure 1:
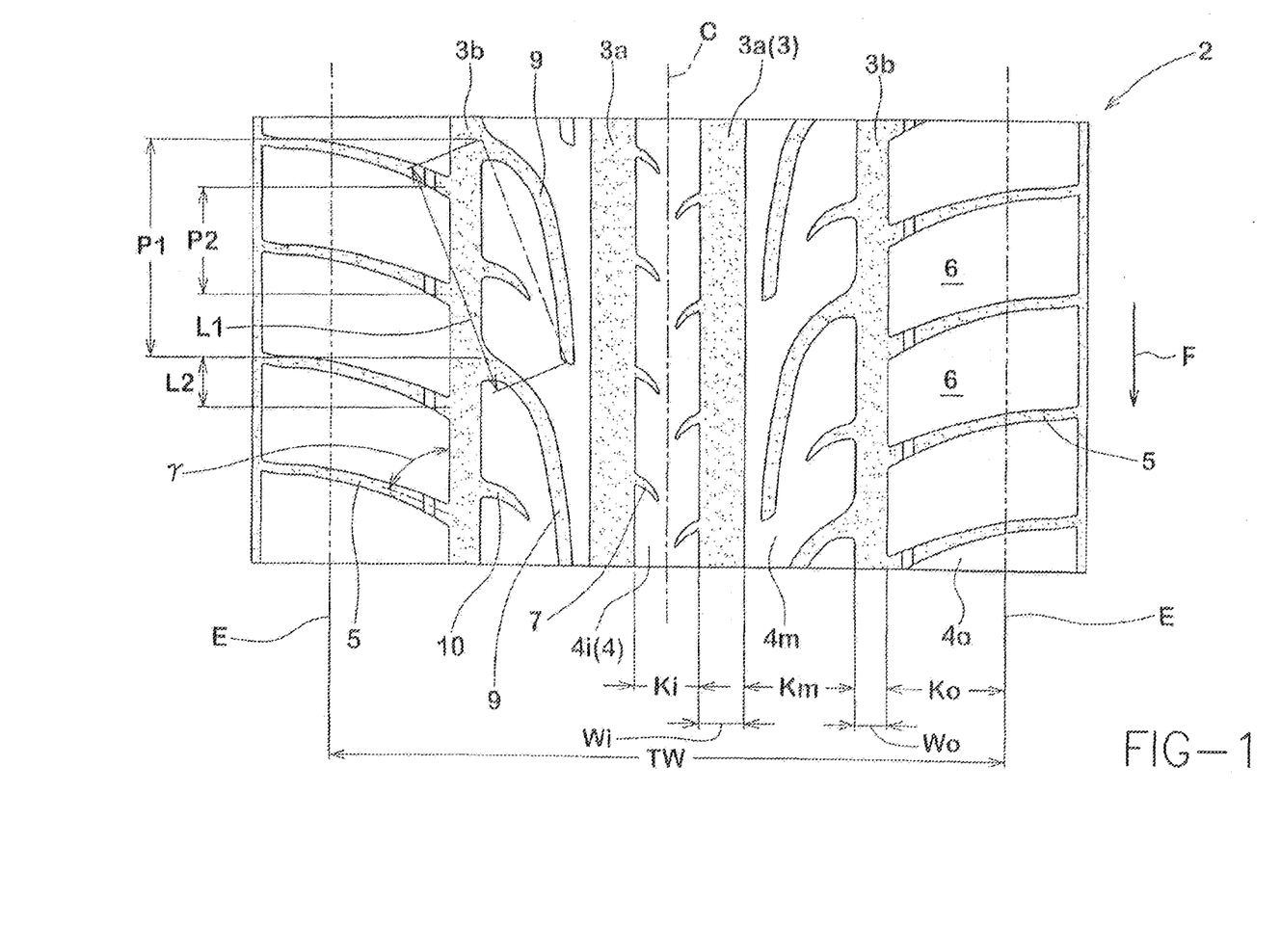
FIG. 1 is a development of a tread pattern showing one embodiment of a pneumatic tire of the present invention.

FIG. 1 is a development of a tread pattern when the tire of the present invention is for a passenger vehicle. In FIG. 1, the pneumatic tire has a rib/lug type tread pattern on a tread surface 2. The tread pattern has total four longitudinal grooves 3, i.e., two inner longitudinal grooves 3a extending on opposite sides of the tire equator C in a circumferential direction of the tire, and two outer longitudinal grooves 3b extending on opposite sides of the inner longitudinal grooves 3a in the circumferential direction of the tire.

Especially in this example, the tread pattern is a so-called directional pattern in which a direction of the tire when the tire is mounted to the vehicle, i.e., the tire rotation direction F is specified. Patterns on both left and right sides of the tire equator C are symmetric when pitch variation and shifts in phase in the circumferential direction of the tire are ignored.

The inner and outer longitudinal grooves 3a and 3b continuously extend straightly. Groove widths Wi and Wo (groove width is an opening width on the tread surface 2) and groove depths of the grooves 3a and 3b are not especially limited in this application, and may be conventional widths and depths. For example, it is preferable that the groove widths Wi and Wo are set to 2 to 9% of a tread-ground contact width TW, and the groove depth is set in a range of 6.0 to 10.0 mm. It is preferable that the groove width Wi of the inner longitudinal grooves 3a is as wide as 1.1 to 1.5 times the groove width Wo of the outer longitudinal grooves 3b. With this configuration, the dewatering effect near the tire equator C where the dewatering effect is prone to be deteriorated when the vehicle runs straightly can be enhanced, and deterioration of rigidity feeling at the time of turning of the vehicle can be suppressed.

Here, the "tread-ground contact width TW" means a distance in the axial direction of the tire between the tread-ground contact ends E and E when the tire is assembled to the regular rim, a regular internal pressure is charged into the tire and a regular load is applied, and a flat surface of the tire is allowed to come into contact with the ground. Here, the "regular rim" is a rim determined for each tire by a standard including one on which the tire is based, and the regular rim is a standard rim in the case of JATMA, a "Design Rim" in the case of TRA, and a "Measuring Rim" in the case of ETRTO. Further, "regular internal pressure" means an air pressure determined for each tire by the standard. The "regular internal pressure" is a maximum air pressure in JATMA, a maximum value described in "TIRE LOAD LIMITS AT VARIOUS COLD INFLATION PRESSURES" in the case of TRA, and "INFLATION PRESSURE" in the case of ETRTO. When the tire is for a passenger vehicle, the regular internal pressure is 180 KPa. Further, the "regular load" is a load determined for each tire by the standard, and is a maximum load ability in the case of JATMA, a maximum value described in a Table "TIRE LOAD LIMITS AT VARIOUS COLD INFLATION PRESSURES" in the case of TRA, and a "LOAD CAPACITY" in the case of ETRO. When the tire is for a passenger vehicle, the regular load is 0.88 times the above values.

In this pneumatic tire, by providing the longitudinal grooves 3, the tread surface 2 is divided into five land portions 4, i.e., a central land portion 4i between the inner longitudinal grooves 3a and 3a, intermediate land portions 4m between the inner and outer longitudinal grooves 3a and 3b, and shoulder land portions 4o located outward of the outer longitudinal grooves 3b in the axial direction of the tire.

Among them, the central land portion 4i and the intermediate land portions 4m are formed as circumferential ribs which continuously extend in the circumferential direction of the tire. The shoulder land portions 4o are formed as block rows in which blocks 6 divided by lug grooves 5 are arranged in the circumferential direction of the tire.

Here, by forming the central land portion 4i as the circumferential rib, circumferential rigidity near the tire equator where the grounding pressure is increased when the vehicle runs straightly is increased, and the high steering stability at the time of straight running of the vehicle is secured. Although the central land portion 4i is formed into the circumferential rib, if a land portion width Ki in the axial direction of the tire is excessively small, the rigidity is insufficient and it is difficult to secure the high steering stability. If the land portion width Ki is excessively great, the dewatering performance around the tire equator is deteriorated. Thus, it is preferable that the land portion width Ki is 5 to 20% of the tread-ground contact width TW.

The central land portion 4i can be provided with lug-like incisions 7 in a range where the central land portion 4i is not divided in the circumferential direction. As in this example, it is preferable that the incisions 7 are formed alternately without extending beyond the tire equator C from opposite side lines of the central land portion 4i because the dewatering performance in the vicinity of the tire equator can be enhanced while securing the circumferential rigidity.

Figure 2:
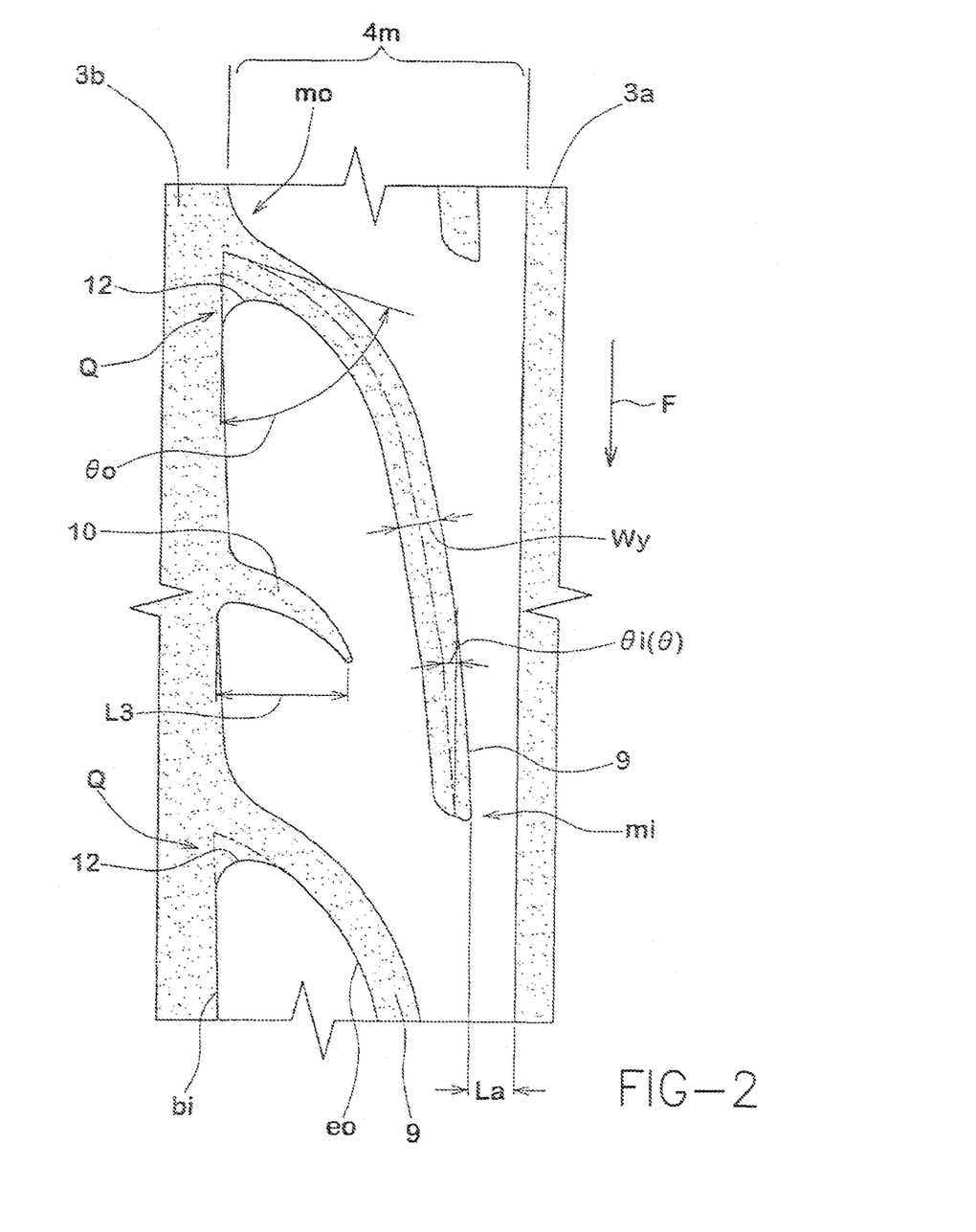
FIG. 2 is an enlarged diagram of inclined grooves.

As shown in FIG. 2 in an enlarged manner, inclined grooves 9 whose one ends are opened extend axially outward of the tire at distances from one another while increasing an angle θ with respect to the circumferential direction of the tire. The inclined grooves 9 extend from inner ends (mi) which are separated from the inner longitudinal grooves 3a by a small distance La to outer ends (mo) which intersect with outer longitudinal grooves 3b. In this example, a groove width Wy of the inclined grooves 9 is smaller than a groove width Wo of the outer longitudinal grooves 3b, and is preferably 40 to 60% of the groove width Wo.

In this example, since the pattern is the directional pattern, any of the inclined grooves 9 on the left and right opposite sides of the tire equator C are inclined from the inner end (mi) directing forward of the tire rotation direction F to the outer end (mo) directed rearward of the tire rotation direction F. At that time, it is necessary to set an angle θi in the inner end (mi) in a range of 0 to 25°, and to set an angle θo in the outer end (mo) in a range of 60 to 80°. The angles θi and θo are angles formed between the groove center line and the circumferential direction of the tire. When the groove center line is a curved line, the angles θi and θo are defined as angles formed between the tangent and the circumferential direction of the tire.

Inclined grooves 9 extend such as to smoothly curve along a water flow line from the inner end (mi) having the angle θi of 0 to 25° to the outer end (mo) having the angle θo of 60 to 80°. Therefore, the resistance with respect to the flowing water can be reduced. As a result, when the tire rotates, water on the road surface can smoothly and swiftly be introduced from the inner end (mi) to the outer longitudinal grooves 3b through the outer end (mo), and it is possible to discharge the water out from the grounding surface efficiently.

Further, since the inner end (mi) of the inclined grooves 9 is adjacent to the inner longitudinal grooves 3a, water existing in a wide range within the intermediate land portions 4m can be discharged to the outer longitudinal grooves 3b. Since the angle θi of the inner end (mi) of the inclined grooves 9 is as small as 0 to 25°, the effect for braking the water film and swiftly discharging the water can be exhibited strongly. This abruptly inclined groove portion exists in the intermediate land portions 4m where the grounding pressure is increased when the vehicle turns. Therefore, the anti-hydroplaning performance at the time of turning of the vehicle can also be enhanced.

Since the inner end (mi) of the inclined grooves 9 is separated from the inner longitudinal grooves 3a, high rigidity can be secured. Since rigidity in the circumferential direction in the vicinity of the inner longitudinal grooves 3a can be maintained, high steering stability can be secured when the vehicle runs straightly. For this purpose, it is preferable that the small distance La is in a range of 3 to 10 mm, more preferably 4 to 8 mm. If the small distance La is less than 3 mm, the rigidity of the intermediate land portions 4m is insufficient, and if the small distance La exceeds 10 mm, dewatering performance is deteriorated.

Since the inclined grooves 9 are separated from the inner longitudinal grooves 3a, it is possible to prevent the compressed air from flowing into the inner longitudinal grooves 3a. Therefore, columnar resonance is not generated in the inner longitudinal grooves 3a, and the deterioration of the noise performance can be suppressed.

The angle θo of the outer end (mo) of the inclined grooves 9 is as gentle as 60 to 80°. Therefore, in the vicinity of the outer longitudinal grooves 3b where severity at the time of turning of the vehicle becomes highest, high rigidity in the axial direction of the tire of the intermediate land portions 4m can be secured, and the steering stability and the anti-hydroplaning performance at the time of turning of the vehicle can be enhanced. For achieving the anti-hydroplaning performance at the time of turning of the vehicle, it is necessary not only to enhance the dewatering performance but also to secure the pattern rigidity enough to generate high cornering force. Therefore, even if the dewatering performance is sufficient, if the rigidity of the intermediate land portions 4m is insufficient, the anti-hydroplaning performance is deteriorated. The inclined grooves 9 can satisfy both of them.

Since the inclined grooves 9 are curved (also bent), the compressed air from the inclined grooves 9 are not abruptly discharged into the outer longitudinal grooves 3b, the columnar resonance in the outer longitudinal grooves 3b can be suppressed to the minimum, and the deterioration of the noise performance can be reduced.

It is necessary to set a pitch P1 (shown in FIG. 1) between the inclined grooves 9 and 9 in the circumferential direction of the tire greater than a pitch P2 between the lug grooves 5 and 5 in the circumferential direction of the tire.

With this configuration, the rigidity of the intermediate land portions 4m can reliably be secured, it is possible to secure sufficient length of the steep inclined groove portion of the inclined grooves 9 where the angle θ becomes 45° or less, and the high dewatering performance can be exhibited. Thus, it is preferable that the pitch P1 is 1.5 to 3.0 times the pitch P2. If the pitch P1 is less than 1.5 times, the above effect can not be exhibited effectively, and if the pitch P1 exceeds 3 times the pitch P2, the inclined grooves 9 becomes excessively long, and the columnar resonance is prone to be generated in the inclined grooves 9. From such a viewpoint, it is also preferable that a straight distance L1 between the inner and outer ends (mi) and (mo) of the inclined grooves 9 is 20 to 40% of the tread-ground contact width TW.

For the same purpose, it is preferable that a land portion width Km (shown in FIG. 1) of the intermediate land portions 4m is in a range of 10 to 20% of the tread-ground contact width TW and is greater than the land portion width Ki. If the land portion width Km is less than 10%, sufficient rigidity can not be secured, and if the land portion width Km exceeds 20%, a land portion width Ko (shown in FIG. 1) of the shoulder land portion 4o is relatively reduced and thus, the cornering force is prone to be reduced, and the steering stability is deteriorated. It is preferable that that the land portion width Ko is 10 to 30% of the tread-ground contact width TW and is greater than the land portion width Km.

The pitch P1 of the inclined grooves 9 is different from the pitch P2. With this configuration, opening positions of the inclined grooves 9 and the lug grooves 5 in the outer longitudinal grooves 3b can be staggered in the circumferential direction, and the columnar resonance generating effect of the outer longitudinal grooves 3b can be suppressed. It is preferable that the pitch P1 is two times the pitch P2, a distance L2 in the circumferential direction of the tire between the opening position (corresponding to the outer end (mo)) of the inclined grooves 9 and the opening position (corresponding to the inner end) of the lug grooves 5 closer to the inclined grooves 9 is set to 20 to 50% of the pitch P2. In this example, the pitch of the incision 7 in the circumferential direction is the same as the pitch P2 of the lug grooves 5.

If the pitches P1, P2 and the like are varied by pitch variation, the average value is employed.

From viewpoint of the noise performance, it is preferable that phase of the inclined grooves 9 disposed on one side of the tire equator C and the phase of the inclined grooves 9 disposed on the other side of the tire equator C are shifted because the noise can be dispersed. As shown in FIG. 2, the intermediate land portions 4m may be provided with a lug-like incision 10 which extends from the outer longitudinal grooves 3b between the inclined grooves 9 and 9. In such a case, it is necessary that a length L3 of the incision 10 in the axial direction of the tire is less than 50% of the land portion width Km. With this, the anti-hydroplaning performance at the time of turning of the vehicle can be enhanced while suppressing adverse influence on the noise performance. It is preferable that the width of the incision 10 is set smaller than the groove width Wy of the inclined grooves 9.

Next, in this example, the outer end (mo) of the inclined grooves 9 is provided with a chamfered portion 12 from which a corner portion Q is removed. At the corner portion Q, an axially outer groove wall (eo) of the inclined grooves 9 and an axially inner groove wall (bi) of the outer longitudinal grooves 3b intersect with each other. In this chamfered portion 12, the groove width Wy of the inclined grooves 9 is locally increased, and direction of air flowing out from the inclined grooves 9 is locally changed. As a result, a pumping noise from the inclined grooves 9 can be reduced while enhancing the dewatering effect, and the generation-suppressing effect of the columnar resonance of the outer longitudinal grooves 3b can further be enhanced.

Figure 3:
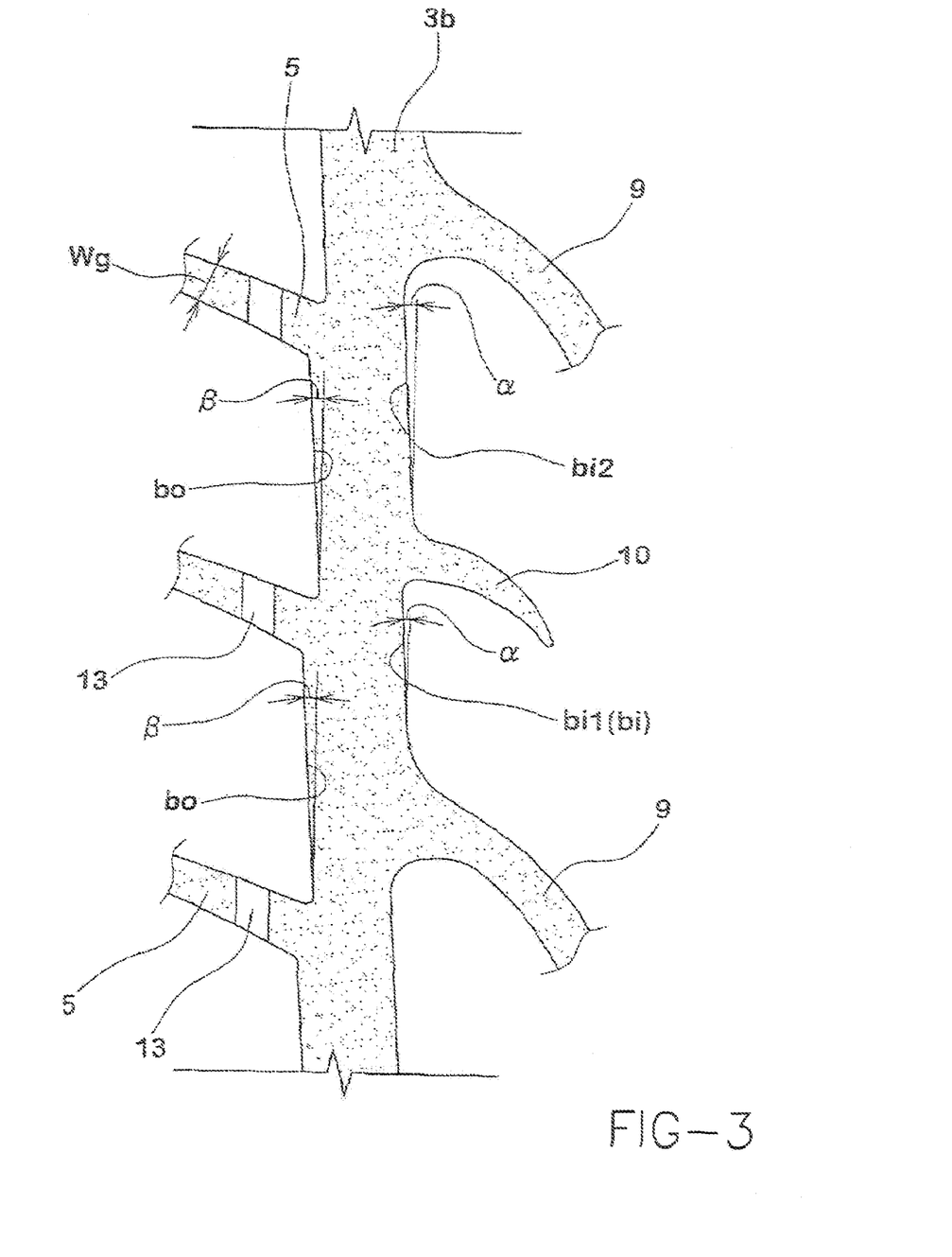
FIG. 3 is an enlarged diagram of outer longitudinal grooves.

In order to further suppress the columnar resonance in the outer longitudinal grooves 3b, in this example as shown in FIG. 3, the groove wall (bi) of the outer longitudinal grooves 3b inside the axial direction of the tire is inclined rearward in the tire rotation direction F at a small angle α outward of the axial direction of the tire between the inclined grooves 9 and 9 which are adjacent in the circumferential direction of the tire.

More specifically, when the inner groove wall (bi) is divided into a first groove wall portion (bi1) extending from the inclined grooves 9 rearward in the tire rotation direction F to the incision 10, and a second groove wall portion (bi2) extending from the incision 10 to the inclined grooves 9, in this example, the groove wall portions (bi1) and (bi2) are formed into sawtooth-like zigzag shapes which are inclined rearward in the tire rotation direction F at the small angle α outward of the axial direction of the tire. At that time, it is preferable that the small angle α is 1 to 6°. If the angle is less than 1°, stirring effect of air is reduced, and the columnar resonance suppressing effect becomes insufficient. If the angle exceeds 6° on the contrary, the dewatering performance is deteriorated and uneven wear is caused. The first and second groove wall portions (bi1) and (bi2) may be formed into one inclined line, and this may be repeated to form the sawtooth-like zigzag shape.

For the same purpose, in this example, the groove wall (bo) of the outer longitudinal grooves 3b outside the axial direction of the tire is inclined rearward in the tire rotation direction between the lug grooves 5 and 5 which are adjacent to each other in the circumferential direction while having a small angle β outside the axial direction of the tire. That is, the groove wall portion bi1 between the lug grooves 5 and 5 is formed into a sawtooth-like zigzag shape while having the small angle β. At that time, it is preferable that the small angle β is equal to the small angle α. With this configuration, the groove width Wo of the outer longitudinal grooves 3b becomes substantially constant, and the dewatering performance is prevented from being deteriorated.

The lug groove 5 disposed on the shoulder land portion 4o has an angle of 60 to 90° with respect to the circumferential direction of the tire, and inclines in the same direction as that of the inclined grooves 9. With this configuration, water existing in the shoulder land portion 4o is discharged from a tread grounding end E, and the block rigidity in the axial direction of the tire is secured.

In the present invention, since the tire has the inner and outer longitudinal grooves 3a and 3b and the inclined grooves 9, even when the load center is moved outward in the axial direction of the tire when the vehicle turns, sufficient dewatering performance is secured. Thus, if the groove width Wg of the lug grooves 5 is gradually reduced outward in the axial direction of the tire and the block rigidity is gradually increased outward in the axial direction of the tire, the anti-hydroplaning performance at the time of turning of the vehicle can be enhanced.

At that time, it is preferable that a large amount of water from the outer longitudinal grooves 3b flows into the lug grooves 5 and the deterioration of the dewatering performance is prevented. For this purpose, in this example, a groove volume reducing portion 13 which reduces the groove volume of the lug grooves 5 is provided in the vicinity of an intersecting portion (corresponding to the inner end) between the lug grooves 5 and the outer longitudinal grooves 3b. In this example, the groove volume reducing portion 13 is a tie-bar like protuberance formed in a groove bottom. The groove volume reducing portion 13 may be a narrow neck which locally reduces the groove width Wg. It is preferable that the groove volume of the lug grooves 5 in the groove volume reducing portion 13 is equal to or smaller than a groove volume of the lug grooves 5 in the tread grounding end E. The groove volume reducing portion 13 can also suppress a pattern noise caused by pitch component generated by compressed air which flows out from the lug grooves 5.

Although especially preferred example of the present invention has been described in detail, the invention is not limited to the illustrated example, and the invention can be carried out in variously modified modes. For example, both the left and right side tread patterns of the tire equator C may be reversed in the circumferential direction of the tire and may be asymmetric, or the tread surface 2 may be provided with a siping.

EMBODIMENTS

Radial tires for a passenger vehicle having a tread pattern shown in FIG. 1 and size of 235/45R17 were prototyped based on the specifications shown in Table 1. The anti-hydroplaning performance, the steering stability on a dry road, and the noise performance of each tire were tested, and a result thereof is described in Table 1. Specifications other than those shown in Table 1 are the same for all tires.

(1) Anti-hydroplaning Performance:

The test tires were mounted to a vehicle under the condition of rim (8JJ×17) and internal pressure (200 kPa), and the vehicle was run on an asphalt road having a radius of 100 m. The road had a puddle of water (5 mm depth and 20 m length). The vehicle was allowed to run while increasing the speed in stages, the lateral acceleration (lateral G) was measured, and the average lateral G of front wheels at speed of 50 to 80 km/h was calculated (lateral hydroplaning test). A result thereof is indicated with indices while determining the comparative example 1 as being 100. A greater value indicates more excellent result.

(2) Steering Stability

The vehicle was allowed to run on a dry asphalt road which was a tire test course, and the steering wheel response, rigidity feeling and characteristics concerning grip are evaluated by a driver's sensory evaluation and indicated with indices while determining the comparative example 1 as being 100. A greater value indicates more excellent result.

(3) Noise Performance

The vehicle was allowed to run on a smooth asphalt road at speed of 60 km/h, overall noise level dB (A) that could be noticed in the vehicle was measured at a position closer to a left ear at a driver's seat. The nose level dB(A) is indicated as a noise difference with respect to the embodiment 1. Here, a symbol "−" (minus) shows that the road noise is lower than the embodiment 1.

TABLE 1

|  | Embodiment 1 | Comparative example 1 | Comparative example 2 | Comparative example 3 | Comparative example 4 |
| --- | --- | --- | --- | --- | --- |
| Tread grounding width TW (mm) | 216 | 216 | 216 | 216 | 216 |
| Inner longitudinal groove width (Wi/TW) | 6.50% | 6.50% | 6.50% | 6.50% | 6.50% |
| Outer longitudinal groove width (Wo/TW) | 5.00% | 5.00% | 5.00% | 5.00% | 5.00% |
| Depth of inner and outer longitudinal grooves (mm) | 8.0 | 8.0 | 8.0 | 8.0 | 8.0 |
| Land width of central land portion (Ki/TW) | 10.0% | 10.0% | 10.0% | 10.0% | 10.0% |
| Land width of intermediate land portion (Km/TW) | 13.5% | 13.5% | 13.5% | 13.5% | 13.5% |
| Land width of shoulder portion (Ko/TW) | 20.0% | 20.0% | 20.0% | 20.0% | 20.0% |
| Presence or absence of inclined grooves | Presence | Presence | Presence | Presence | Presence |
| Groove width (Wy/Wo) | 50% | 50% | 50% | 50% | 50% |
| Small distance La (mm) | 5.3 | 5.3 | 5.3 | 5.3 | 5.3 |
| Angle $\theta_i$ (°) | 7 | 30 | 25 | 7 | 7 |
| Angle $\theta_o$ (°) | 70 | 70 | 70 | 70 | 45 |
| Distance (L1/TW) | 35% | 20% | 20% | 60% | 35% |
| Distance (L2/P2) | 40% | 40% | 40% | 40% | 40% |
| Distance (L3/Km) | 48% | 48% | 48% | 48% | 48% |
| Presence or absence of chamfered portion | Presence | Presence | Presence | Presence | Presence |
| Presence or absence of lug grooves | Presence | Presence | Presence | Presence | Presence |
| pitch (P1/P2) | 2.0 | 1.0 | 1.0 | 3.0 | 2.0 |
| Presence or absence of groove volume reducing portion | Presence | Presence | Presence | Presence | Presence |
| Inner groove wall angle $\alpha$ of outer longitudinal grooves | 3° | 3° | 3° | 3° | 3° |
| Outer groove wall angle $\beta$ of outer longitudinal grooves | 3° | 3° | 3° | 3° | 3° |
| Anti-hydroplaning performance | 100 | 90 | 95 | 102 | 101 |
| Steering stability | 100 | 100 | 100 | 100 | 100 |
| Noise performance | ±0 | −0.1 | ±0 | +0.7 | +0.6 |

|  | Embodiment 2 | Embodiment 3 | Embodiment 4 | Embodiment 5 | Embodiment 6 |
| --- | --- | --- | --- | --- | --- |
| Tread grounding width TW (mm) | 216 | 216 | 216 | 216 | 216 |
| Inner longitudinal groove width (Wi/TW) | 6.50% | 6.50% | 6.50% | 6.50% | 6.50% |
| Outer longitudinal groove width (Wo/TW) | 5.00% | 5.00% | 5.00% | 5.00% | 5.00% |

TABLE 1-continued

|  | | | | | |
|---|---|---|---|---|---|
| Depth of inner and outer longitudinal grooves (mm) | 8.0 | 8.0 | 8.0 | 8.0 | 8.0 |
| Land width of central land portion (Ki/TW) | 10.0% | 10.0% | 10.0% | 10.0% | 10.0% |
| Land width of intermediate land portion (Km/TW) | 13.5% | 13.5% | 13.5% | 13.5% | 13.5% |
| Land width of shoulder portion (Ko/TW) | 20.0% | 20.0% | 20.0% | 20.0% | 20.0% |
| Presence or absence of inclined grooves | Presence | Presence | Presence | Presence | Presence |
| Groove width (Wy/Wo) | 50% | 50% | 50% | 50% | 50% |
| Small distance La (mm) | 5.3 | 5.3 | 5.3 | 5.3 | 5.3 |
| Angle θi (°) | 15 | 20 | 7 | 7 | 7 |
| Angle θo (°) | 60 | 60 | 70 | 70 | 70 |
| Distance (L1/TW) | 35% | 35% | 35% | 35% | 35% |
| Distance (L2/P2) | 40% | 40% | 40% | 40% | 40% |
| Distance (L3/Km) | 48% | 48% | 48% | 48% | 48% |
| Presence or absence of chamfered portion | Presence | Presence | Absence | Presence | Presence |
| Presence or absence of lug grooves | Presence | Presence | Presence | Presence | Presence |
| pitch (P1/P2) | 2.0 | 2.0 | 2.0 | 2.0 | 2.0 |
| Presence or absence of groove volume reducing portion | Presence | Presence | Presence | Presence | Absence |
| Inner groove wall angle α of outer longitudinal grooves | 3° | 3° | 3° | 0° | 3° |
| Outer groove wall angle β of outer longitudinal grooves | 3° | 3° | 3° | 0° | 3° |
| Anti-hydroplaning performance | 99 | 98 | 98 | 100 | 100 |
| Steering stability | 100 | 100 | 100 | 100 | 100 |
| Noise performance | −0.1 | −0.2 | +0.1 | +0.3 | +0.2 |

INDUSTRIAL APPLICABILITY

As described above, according to the pneumatic tire of the present invention, the anti-hydroplaning performance can largely be enhanced while suppressing deterioration in steering stability and noise performance.

The invention claimed is:

1. A pneumatic tire in which a tread surface thereof is divided into a central land portion between inner longitudinal grooves, intermediate land portions between the inner and outer longitudinal grooves, and shoulder land portions axially outside the outer longitudinal grooves, by being provided with the inner longitudinal grooves extending on both sides of a tire equator in a circumferential direction of the tire and the outer longitudinal grooves extending on both sides thereof in the circumferential direction of the tire, a width Wi of the inner longitudinal grooves being 1.1 to 1.5 times a width Wo of the outer longitudinal grooves, wherein the central land portion and the intermediate land portions are formed into circumferential ribs which continuously extend in the circumferential direction of the tire, and on each of the shoulder land portions, blocks divided by lug grooves are arranged as a block row in the circumferential direction of the tire, each intermediate land portion includes inclined grooves extending outward in the axial direction of the tire from an inner end away from the inner longitudinal groove by a small distance La to an outer end which intersects with the outer longitudinal grooves while increasing an angle θ with respect to the circumferential direction of the tire, the angle θ in the inner end is 0 to 25° and the angle θ in the outer end is 60 to 80°, a pitch P1 between the inclined grooves in the circumferential direction of the tire is greater than a pitch P2 between the lug grooves in the circumferential direction of the tire, the lug grooves each being provided with a groove volume reducing portion in the vicinity of an intersecting portion between the lug grooves and the outer longitudinal grooves, each groove volume reducing portion reducing a groove volume of each lug groove, each groove volume reducing portion being a tie-rod which protrudes from a groove bottom of each lug groove.

2. The pneumatic tire according to claim 1, wherein the outer end of the inclined grooves includes a chamfered portion from which a corner portion where an axially outer groove wall of the inclined grooves and an axially inner groove wall of the outer longitudinal grooves intersect with each other is removed.

3. The pneumatic tire according to claim 1, wherein an axially inner groove wall of each outer longitudinal groove is inclined at an angle α relative to a circumferential direction of the tire.

4. The pneumatic tire according to claim 3, wherein an axially outer groove wall of each outer longitudinal groove is inclined at an angle β relative to a circumferential direction of the tire.

5. The pneumatic tire according to claim 1, wherein a width of the lug grooves is reduced outward in the axial direction of the tire.

6. The pneumatic tire according to claim 1, wherein a width Wy of the inclined grooves is smaller than the width Wo of the outer longitudinal grooves.

7. The pneumatic tire according to claim 6, wherein the width Wy of the inclined grooves is 40 to 60% of the width Wo of the outer longitudinal grooves.

8. The pneumatic tire according to claim 1, wherein the small distance La is 3 to 10 mm.

9. The pneumatic tire according to claim 1, wherein a width Ki of the central land portion is 5 to 20% of a tread-ground contact width TW.

10. The pneumatic tire according to claim 1, wherein a width Km of the intermediate land portion is 10 to 20% of a tread-ground contact width TW and is greater than the width Ki of the central land portion.

11. The pneumatic tire according to claim 1, wherein a width Ko of the shoulder land portion is 10 to 30% of a tread-ground contact width TW and is greater than the width Km of the intermediate land portion.

12. The pneumatic tire according to claim 4, wherein the angles $\alpha$ and $\beta$ are 1 to 60°.

13. The pneumatic tire according to claim 12, wherein the angle $\alpha$ and the angle $\beta$ are equal to each other.

14. The pneumatic tire according to claim 1, wherein a straight distance Li between the inner end and the outer end of the inclined grooves is 20 to 40% of a tread-ground contact width TW.

* * * * *